United States Patent [19]

Bollman

[11] 4,307,682
[45] Dec. 29, 1981

[54] WATER DISPENSING APPARATUS

[75] Inventor: Donald R. Bollman, Dassel, Minn.

[73] Assignee: Miller Little Giant Co., Inc., South St. Paul, Minn.

[21] Appl. No.: 197,935

[22] Filed: Oct. 17, 1980

[51] Int. Cl.³ .............................................. A01K 7/06
[52] U.S. Cl. .................................................... 119/75
[58] Field of Search ................ 119/75, 72.5; 251/146, 251/339

[56] References Cited

U.S. PATENT DOCUMENTS

| | | | |
|---|---|---|---|
| 2,534,475 | 12/1950 | Peterson | 119/75 |
| 3,527,193 | 9/1970 | Smith | 119/72.5 |
| 3,534,710 | 10/1970 | Olde | 119/75 |
| 3,563,264 | 2/1971 | Boegli et al. | 119/75 X |

FOREIGN PATENT DOCUMENTS 354626 10/1905 France .............................. 119/75

Primary Examiner—Hugh R. Chamblee
Attorney, Agent, or Firm—Neil B. Schulte

[57] ABSTRACT

A watering cup especially useful for watering chickens having a first contact actuated valve for admitting water which first valve bears against a second interior valve and holds the second valve open. The first valve can be removed for cleaning and inspection without the necessity of shutting down the water pressure since removal of the first valve closes the second valve and prevents leakage.

8 Claims, 1 Drawing Figure

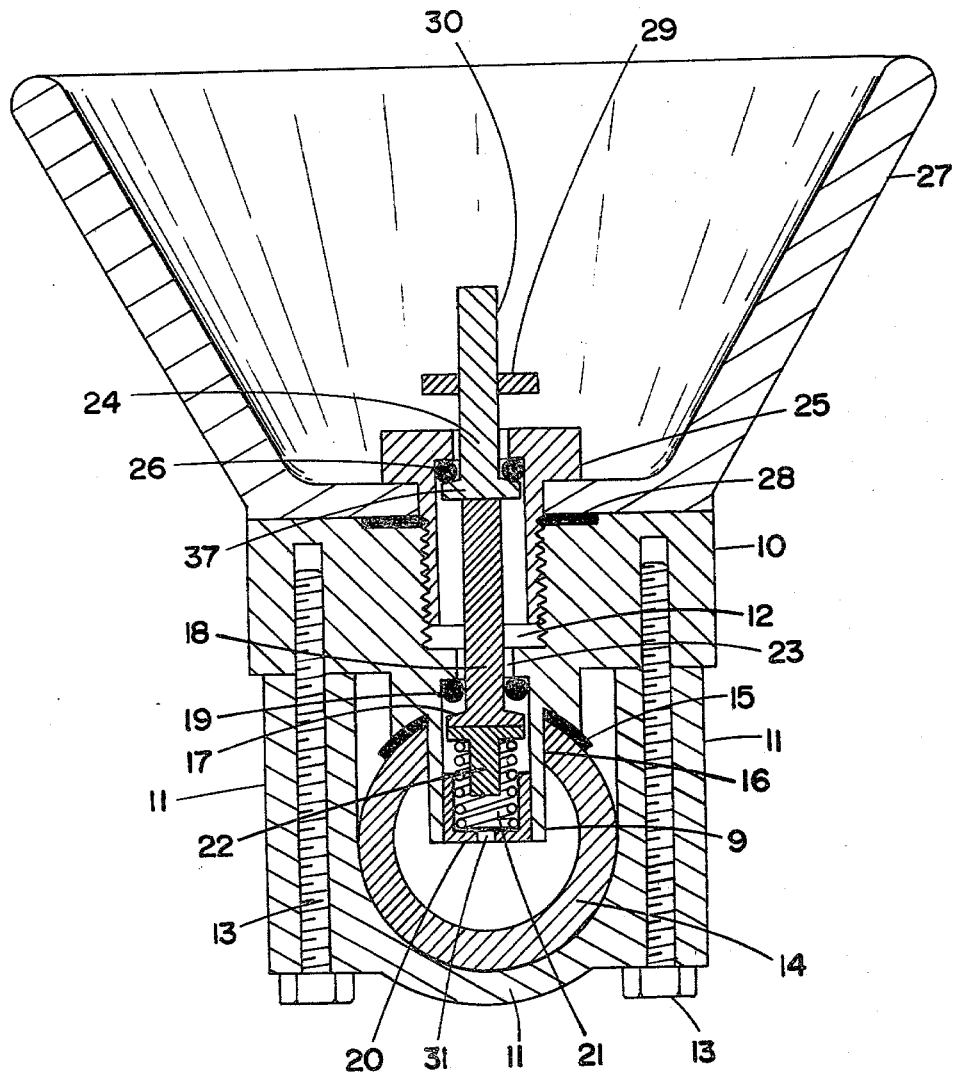

WATER DISPENSING APPARATUS

BACKGROUND OF THE INVENTION

It is known in the prior art to provide a multitude of watering cups attached to a single pressurized water distribution system in larger scale poultry houses. These watering cups typically utilize a spring loaded valve with a small portion of the valve extending into the watering cup where it can be moved by the chickens so as to admit small amounts of water. A continuing and troublesome problem with prior art devices is that the valves often leak due to an accumulation of dirt either from the chicken house or from the water supply which gets into the mechanism of the valve and jams it into an open position. Leaks are particularly undesirable since they create a wet condition around the watering cup in the bird droppings which in turn causes the growth of bacteria, bad odors, and generally unsanitary conditions.

Although many approaches have been tried by the prior art to make the valves clog and dirt proof, no satisfactory solution has yet come forth. The best approach remains that of actually disassembling and cleaning leaky valves as they are encountered. Unfortunately, this means that the operator must shut down the water supply system to all of the cups since removal of any one valve will open up the system at that point allowing the water to spray out. My invention overcomes this problem by providing an easily cleanable valve with a detachable cup as described hereinafter.

SUMMARY OF THE INVENTION

Briefly, the present invention contemplates a dual valve arrangement wherein the operational valve is positioned in such a way as to hold open an interior valve during normal operation. The second interior valve is allowed to close under the action of a spring when the first valve is removed for cleaning or inspection. Thus, any troublesome water admission valve may be inspected and cleaned when it is found to require service without the necessity of shutting down the entire water supply system. Therefore, it may be seen that it is an object of this invention to provide an improved and more easily maintained system. It is a further object of this invention to provide a water dispensing apparatus which lends itself to impromptu, on the spot, maintenance without the necessity of shutting down the entire water supply system and thus discouraging the operator from an immediate repair. Additional objects and advantages will become apparent upon consideration of the following detailed description and drawing.

BRIEF DESCRIPTION OF THE DRAWING

In the drawing a schematic elevational section of the water dispensing apparatus of the instant invention is shown.

DESCRIPTION OF THE PREFERRED EMBODIMENT

Referring to the drawing, a base member 10 is shown which includes a passageway 12 therethrough that continues from the top of base member 10 to the bottom of an extending portion 9. Base member 10 is adapted to rest upon the surface of a water supply pipe 14 with the extended portion 9 projecting through an opening 16 in water pipe 14. A suitable rubber gasket 15 may be employed to ensure a water tight seal between the water supply pipe 14 and the base member 10.

Base member 10 is secured to water pipe 14 by any suitable means. In the preferred embodiment a clamp 11 is provided which wraps around pipe 14 and is held to base member 10 by means of a pair of screws 13. The exact method of fastening base member 10 to supply pipe 14 is not considered pertinent and any other suitable embodiment is acceptable.

Disposed within passageway 12 is a valve 18 which is springably urged against a sealing member 19 which, in the preferred embodiment, comprises an o-ring surrounding the generally cylindrical valve 18. Sealing member 19 will operate to close passageway 12 by bearing against the narrow portion 23 of passageway 12 when the flange 17 of valve 18 is allowed to rise upwards against sealing member 19 under the action of a spring 21. Spring 21 is held in position inside base member 10 by a spring retaining insert 20 which is press fitted into the extended portion 9 of base member 10. Spring 21 urges valve 18 upwards through the action of a spring keeper 22 which is positioned at the top and inside spring 21 so as to bear against the underside of valve 18.

As shown in the drawing, water can pass from pipe 14 through a small hole 31 in insert 20 and past flange 17 and into passageway 12 due to the fact that valve 18 is held down by a second valve 24 which rests on the upper end thereof. Valve 24 is also urged upwards against a retaining means 25 by means of spring 21. Thus, passageway 12 is sealed by a sealing member 26, again comprising an o-ring in the preferred embodiment. A flange 37 on the bottom of valve 24 bears against o-ring 26 so as to prevent the admission of water into a water cup 27 which is mounted to the top of base member 10 by means of retaining means 25. A suitable gasket 28 may be provided between detachable water cup 27 and base member 10. An additional extending portion 30 of valve 24 reaches into the interior of water cup 27 where it may be contacted by the chickens in order to induce the admission of water into cup 27.

In operation the birds peck at portion 30 causing a slight movement or tilt downward against the action of spring 21. This creates a small opening between sealing member 26 and valve 24 so as to allow water to enter cup 27. A spray deflector 29 surrounds extending protion 30 so as to deflect the water downward into the cup where the birds can drink it. If dirt interferes with the operation of valve 24 causing a slight leak, valve 24 can be easily removed by the operator as soon as the leak is discovered. The operator simply unscrews retaining means 25 which allows cup 27 to be lifted away and valve 24 to be washed, cleaned, or inspected. As retaining means 25 is unscrewed, the valve 24 will travel upwards under the action of spring 21 maintaining a water tight connection until such time as flange 17 on valve 18 comes into contact with sealing member 19. As this point the second interior valve blocks the admission of any further water into passageway 12. Accordingly, the cup 27, retaining means 25, and valve 24 may be completely removed without losing any water from supply pipe 14. Thus, it is apparent that any leaky valve can be cleaned quickly and immediately upon discovery with only a few seconds of effort thus encouraging an immediate repair and avoiding any unsanitary conditions.

Clearly, a number of modifications could be made to the design of the interior of the valve including different shapes of o-rings and different cylindrical valves. Different spring or spring keeper arrangements would also be possible along with variations in the design of retaining means 25. Accordingly, I do not intend to be bound to the exact structure shown in the drawings except as defined by the appended claims.

I claim:

1. A water dispensing apparatus for poultry comprising in combination:
   a base member adapted to be mounted on a water supply pipe, said base member having a passageway therethrough, said passageway communicating with an opening in the supply pipe so as to admit water thereinto;
   a first valve means in said passageway springably urged by a spring against a first passageway sealing member so as to block said passageway unless said first valve means is moved away from said first passageway sealing member;
   a second valve means retained in said passageway by a retaining means, said second valve means resting on said first valve means so as to also be springably urged by said spring against a second passageway sealing member so as to block said passageway unless said second valve means is moved away from said second passageway sealing member, the normal sealed position of said second valve means being configured to hold said first valve means normally unsealed; and
   a water containing cup disposed on said base member and in communication with said passageway and having a portion of said second valve means extending thereinto so as to be movable by the poultry.

2. The apparatus of claim 1 in which said cup is separable from said base member.

3. The apparatus of claim 2 in which said cup is mounted to said base member with said retaining means.

4. The apparatus of claim 1 in which said first and second valve means comprise generally elongate cylindrically shaped members with flanges thereon, said first and second sealing members disposed about said elongate members and against said flanges so as to be slidable against narrow portions of said passageway to block said passageway.

5. The apparatus of claim 4 in which said cup is separable from said base member.

6. The apparatus of claim 5 in which said cup is mounted to said base member with said retaining means.

7. The apparatus of claim 6 in which the narrow portion of the passageway for the second valve means is formed in said retaining means.

8. The apparatus of claim 7 in which the narrow portion of the passageway for the first valve means is formed in said base member.

* * * * *